United States Patent [19]
Bailey et al.

[11] Patent Number: 5,012,435
[45] Date of Patent: Apr. 30, 1991

[54] MULTIPLE EVENT TIMER CIRCUIT

[75] Inventors: Roger N. Bailey; Robert L. Mansfield; Alexander K. Spencer, all of Austin, Tex.

[73] Assignee: International Business Machines Corporation, Armonk, N.Y.

[21] Appl. No.: 273,295

[22] Filed: Nov. 17, 1988

[51] Int. Cl.⁵ .................. G06F 9/18; G04B 23/12
[52] U.S. Cl. .................. 364/569; 371/16.3; 368/108; 364/200; 364/267.9
[58] Field of Search .......... 364/569, 200, 900, 715.06, 364/431.05; 371/16.3, 62, 61; 368/108, 107; 340/146.2; 377/115-120, 20

[56] References Cited

U.S. PATENT DOCUMENTS

| | | | |
|---|---|---|---|
| 3,564,284 | 2/1971 | Kamens | 307/233 |
| 3,573,652 | 4/1971 | Charters | 331/78 |
| 3,878,370 | 4/1975 | Santomango et al. | 235/92 R |
| 3,881,156 | 4/1975 | Deutsch | 328/129 |
| 3,921,133 | 11/1975 | Pink | 340/146.2 |
| 4,161,787 | 7/1979 | Groves et al. | 364/900 |
| 4,220,990 | 9/1980 | Alles | 364/200 |
| 4,348,743 | 9/1982 | Dozier | 377/20 X |
| 4,538,235 | 8/1985 | Henning | 377/20 X |
| 4,566,111 | 1/1986 | Tanagawa | 377/28 |
| 4,594,685 | 6/1986 | Owens | 364/900 |
| 4,636,967 | 1/1987 | Bhatt et al. | 364/550 |
| 4,690,566 | 9/1987 | Robertsen | 368/108 |
| 4,712,072 | 12/1987 | Kawanabe | 377/20 X |
| 4,763,296 | 8/1988 | Gercekci | 371/16.3 X |
| 4,879,733 | 11/1989 | Burch et al. | 377/20 X |
| 4,956,781 | 9/1990 | Calvird, II et al. | 364/431.05 X |

Primary Examiner—Joseph L. Dixon
Attorney, Agent, or Firm—Thomas E. Tyson

[57] ABSTRACT

A timer including a counter circuit that continuously provides an output of an iteratively increasing sequence of bits. The timer includes a timeout data circuit that forms a timeout data word from a specified time period and a first counter circuit output. A register is provided that stores the timeout data word at an address formed from a second counter circuit output. A comparison circuit is provided that compares each counter output with a timeout data word at the address formed from that counter output and provides a timeout signal when they are equal. This timer includes a constantly incrementing counter to address a register that includes a multiple of timeout condition specifications, and as a determination of when the timeout conditions stored in the register occur.

22 Claims, 7 Drawing Sheets

| CLOCK PERIOD | COUNTER OUTPUT | |
|---|---|---|
| | MSB | LSB |
| 0 | 000 | 00 |
| 1 | 000 | 01 |
| 2 | 000 | 10 |
| 3 | 000 | 11 |
| 4 | 001 | 00 |
| 5 | 001 | 01 |
| 6 | 001 | 10 |
| 7 | 001 | 11 |
| 8 | 010 | 00 |
| 9 | 010 | 01 |
| 10 | 010 | 10 |
| 11 | 010 | 11 |
| 12 | 011 | 00 |
| 13 | 011 | 01 |
| 14 | 011 | 10 |
| 15 | 011 | 11 |
| 16 | 100 | 00 |
| 17 | 100 | 01 |
| 18 | 100 | 10 |
| 19 | 100 | 11 |
| 20 | 101 | 00 |
| 21 | 101 | 01 |
| 22 | 101 | 10 |
| 23 | 101 | 11 |
| 24 | 110 | 00 |
| 25 | 110 | 01 |
| 26 | 110 | 10 |
| 27 | 110 | 11 |
| 28 | 111 | 00 |
| 29 | 111 | 01 |
| 30 | 111 | 10 |
| 31 | 111 | 11 |

FIG. 5

REGISTER FILE

| LSB ADDRESS | MSB' | VALID MSB' BITS | TIME OUT LINE | STATUS |
|---|---|---|---|---|
| 00 | 100 | 01 | 01 | 1 |
| 01 | 101 | 00 | 00 | 1 |
| 10 | 110 | 00 | 11 | 1 |
| 11 | 110 | 00 | 10 | 0 |

FIG. 7

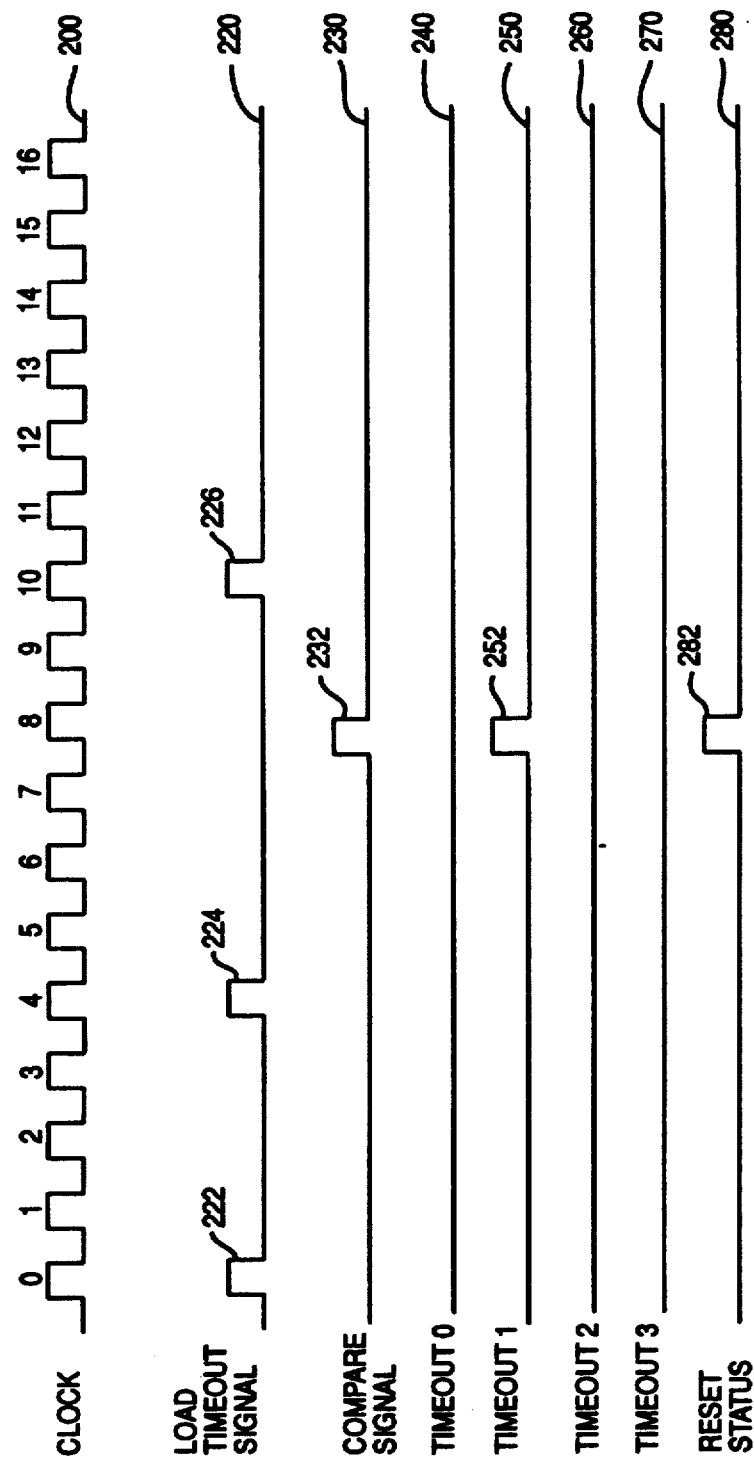

MULTIPLE EVENT TIMER CIRCUIT

TECHNICAL FIELD

The present invention relates to data processing systems and more specifically to timer circuits used in performing operations within data processing systems.

BACKGROUND ART

Data processing systems often require timers in performing operations internally and performing operations with peripheral devices. These timing circuits simply indicate the passage of a specified unit of time. Traditionally, these timers, termed "watch dog timers", time single events. Upon the occurrence of the event, termed "timeout", a signal is generated or an interrupt is generated.

In the past when several timed events must be monitored, one technique requires a timer for each event. Also, software has been used to monitor clocks or timers to determine when certain time periods had expired. The disadvantage in using software is that the time required for performing individual software instructions is usually quite large compared to the resolution or increment unit of time to be measured.

It is the object of the present invention to provide a multiple event timer that provides a capability to monitor a multiple of time periods simultaneously with a single counting circuit.

A further object of the present invention is to provide the capability to designate one of several timeout conditions or signals when selected timeout conditions occur.

DISCLOSURE OF THE INVENTION

In accordance with the present invention a timer circuit is provided that includes a counter circuit for continuously providing an output of an iteratively increasing sequence of bits. A timeout data circuit is included that forms a timeout data word from a specified time period and a first counter circuit output. A register circuit is provided for storing the timeout data word at an address formed from the first counter circuit output. A comparison circuit is also provided that compares each counter circuit output with a timeout data word at an address formed from that each counter circuit output and providing a timeout signal when the two are equal.

In the preferred embodiment, a counter circuit is provided that continuously outputs an iteratively increasing sequence of bits. A timeout data circuit is included that receives information from an external source, such as a user or a software program, that specifies a timeout time period. The timeout data circuit then forms a timeout data word from the specified time period and a first portion of a counter circuit output. In this preferred embodiment, this first portion is a most significant set of bits for the counter output during the time that the timeout time period information was received. The register circuit receives and stores the timeout data word from the timeout data circuit at an address that is specified by a second portion of the counter means output that occurred at the time the timeout time period information was received. In this embodiment, the second portion is the least significant set of bits for the counter circuit output at that time. The comparison circuit then compares a first portion of each current counter means output with a portion of the stored timeout data word which is stored at an address specified by a second portion of that current counter means output.

The comparison means provides a timeout signal when the timeout data word portion is equal to the portion of the current counter means output.

In this embodiment, the information received by the timeout data circuit also includes data specifying which of the bits of the first portion of the counter circuit output can be ignored to specify the timeout time period. This enables the user to more easily specify smaller time periods.

Also, in this embodiment, the information provided to the timeout data circuit can specify which of a plurality of timeout signals is to occur when the specified timeout condition occurs. Further, a status bit in the register is used to indicate when each timeout data word is active, i.e., that the specified timeout period has yet to occur. In the preferred embodiment, the comparison means includes the means to reset the status bit for the addressed timeout data word upon the occurrence of the timeout condition specified by that timeout data word.

The register includes the capability to store several timeout data words. Each timeout data word is stored at a unique address. The timeout data circuit includes the capability to determine if a previously stored timeout data word is still active. If the timeout data circuit is attempting to store a currently formed timeout data word, it will await a next address if the presently stored timeout data word in the present address is still active.

BRIEF DESCRIPTION OF THE DRAWING

The novel features believed characteristic of the invention are set forth in the appended claims. The invention itself, however, as well as other features and advantages thereof, will be best understood by reference to the following Best Mode for Carrying Out the Invention, when read in conjunction with the accompanying figures, wherein:

FIG. 5 is a table illustrating the output of the counter 30 for different clock periods;

FIGS. 6a and 6b are timing diagrams illustrating the output of the clock, load timeout signal line, compare signal line, the four timeout signal lines and the reset status line;

FIG. 7 is a table representing the contents of the register file 10 in an example.

BEST MODE FOR CARRYING OUT THE INVENTION

The present invention is a multiple event timer circuit. This timer circuit has the capability to monitor a multiple of timeout periods and provide either a general single timeout signal or a specific timeout signal upon the occurrence of each timeout period.

Figure 1:
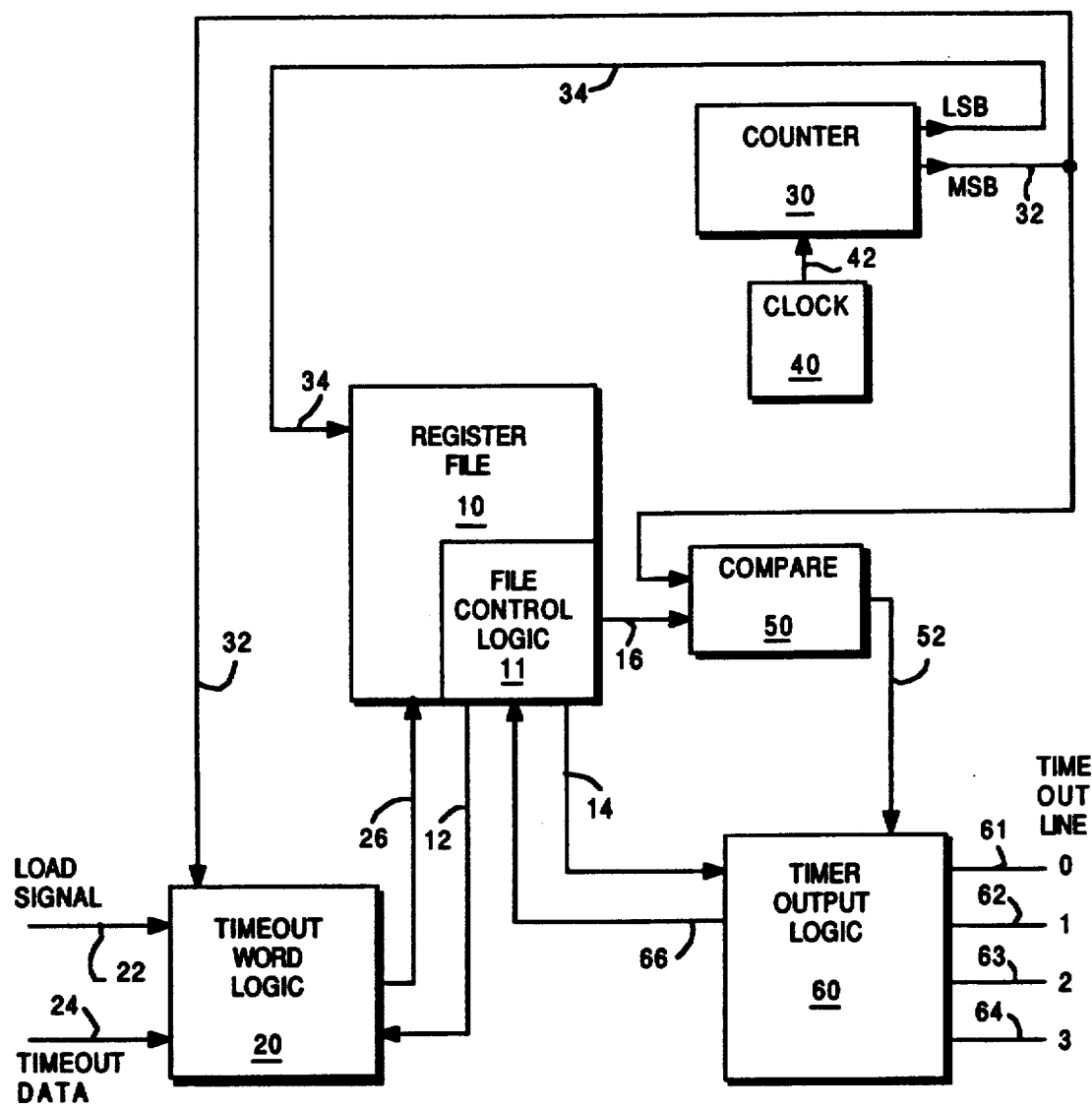
FIG. 1 is a block diagram of the multiple event timer circuit.

FIG. 1 is block diagram of the present invention. In FIG. 1, a clock 40 is connected by line 42 to a counter 30. In the preferred embodiment, the clock 40 is an oscillator providing a constant period signal on line 42 to the counter 30. Counter 30 provides an output on lines 32 and 34. The output of counter 30 is a parallel group of bits that are incrementally increasing in accordance with the clock signals received from the clock 40. Line 34 is the least significant number of bits (LSB) of this output. Line 32 is the most significant bits (MSB) of this output.

In the example to be described, the counter 30 provides a five bit output that is divided into a least significant bit section of two bits and a most significant bit section of three bits. The least significant bit output on line 34 is provided to the register file 10. The most significant bit output on line 32 is provided to the register file 10, the timeout word logic 20, and the compare circuit 50.

The information specifying the time period to be timed is received by the timeout word logic 20 on line 24. Line 22 provides the logic signal to indicate to the timeout word logic 20 that timeout data is present on line 24. The timeout word logic 20 upon receiving the timeout data forms a timeout data word that is loaded into the register file 10 over line 26.

The register file 10 includes file control logic 11 that interfaces with the counter 30 by receiving the least significant bit count on line 34 and the most significant bit count on line 32, and with the timeout word logic 20 by receiving the timeout data word on lines 26 and providing an indication on line 12 to the timeout word logic 20 whether or not the currently addressed data word in the register file 10 includes a status bit that indicates that the data word is still active. This feature will be explained in greater detail.

The register file 10 file control logic 11 also provides a portion of the data word stored in the register file 10 to the compare logic 50. Additionally, the file control logic 11 provides data over line 14 to the timer output logic 60. Such data would specify which one of the timeout lines 60 through 64 is to be activated when a timeout condition occurs. Also, the file control logic' receives a reset status signal on line 66 from the timer output logic 60 when the timeout event for the addressed timeout data word has occurred.

The compare circuit 50 simply compares the most significant bits of the output of the counter 30 on line 32 with a portion of the timeout data word from the register file 10 provided on line 16. When these two entities are equal, the compare circuit 50 provides a signal output on line 52 to the timer output logic 60.

The timer output logic 60, as previously discussed, determines from a portion of the data word being addressed in the register file 10 which timeout line 60-61 is to be activated if a timeout condition occur, as signified by a signal on line 52 from the compare circuit 50. Timeout lines 60-61 provide information as to which timeout condition, i.e., which data word in the register file caused the timeout signal to occur. Also, the timer output logic 60 provides the reset signal on line 66 to the register file 10 as previously discussed.

Figure 2:
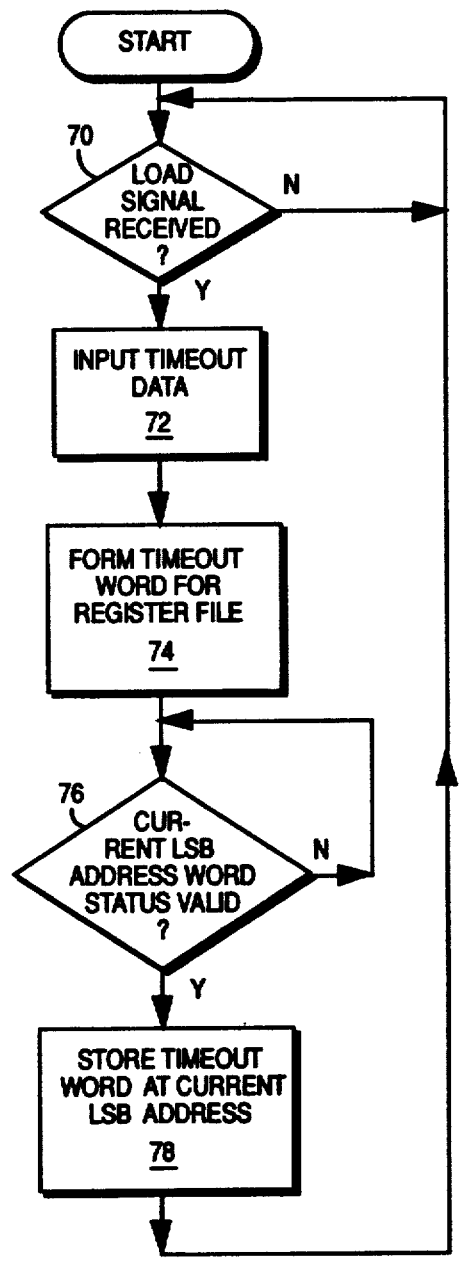
FIG. 2 is a flow chart illustrating the operations performed by the timeout word logic 20.

FIG. 2 is a flow chart for the operation of the timeout word logic 20. Initially, in step 70, the logic determines whether or not a load signal has been received on line 22 (FIG. 1). If not, the logic waits until such a load signal is received by looping back to the beginning of step 70. When the load signal is received, the logic proceeds to step 72 to input the timeout data received on line 24 (FIG. 1). Afterwards, the timeout word logic 20 then forms the timeout word for the register file 10 in step 74. The timeout word logic 20 then determines in step 76 whether the timeout data word stored in the currently addressed location of register file 10 includes a valid status bit. This feature prevents the timeout word logic 20 from writing new timeout data over existing timeout data in the register file 10 when the existing timeout data in the register file 10 is still awaiting a timeout to occur. If the stored timeout data word in the register file 10 does have an active status bit, the timeout word logic 20 waits until the next addressed word in the register file is accessed. This continues until a location is found that has a status bit indicating that the location is available. After a location in the register file 10 has been located, the timeout word logic 20 proceeds to step 78 to store the formed timeout data word at that current address which is indicated by the counter's least significant set of bits output on line 34 (FIG. 1). Upon completion, the timeout word logic 20 then returns to step 70.

Figure 3:
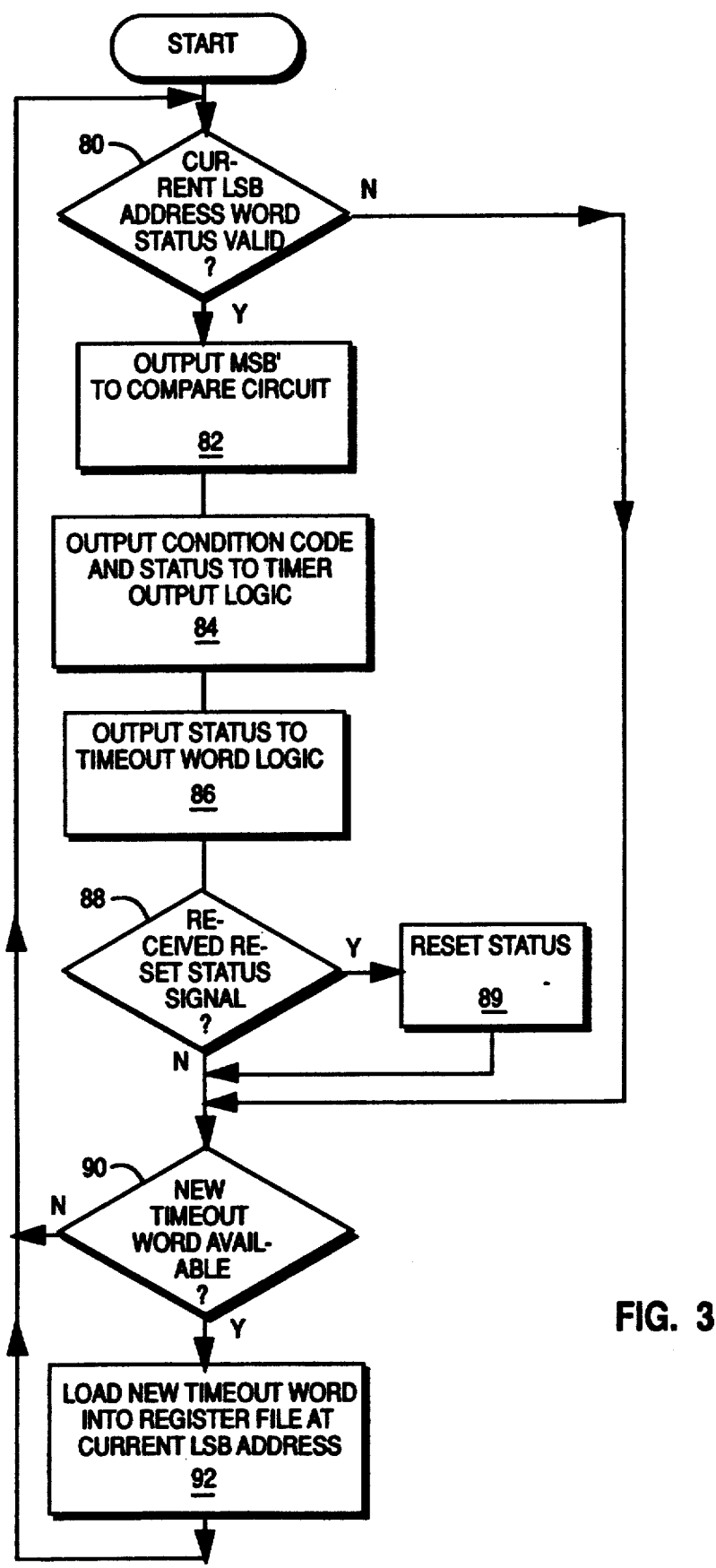
FIG. 3 is a flow chart illustrating the operations of the file control logic 11.

FIG. 3 illustrates the flow for the file control logic 11 in the register file 10. Before discussing the flow in FIG. 3, the structure of the register file 10 will be discussed. In FIG. 7, the register file contents is illustrated. The actual storage area includes a modified most significant bit group which is labeled "MSB'" adjacent to a set of bits indicating which of the MSB' bits are valid, and which are adjacent to a set of bits indicating which of the timeout lines is to be activated upon a timeout condition and lastly adjacent to a status bit. It should be understood that the following example is an extremely simplified version of this invention. The full practical advantages of this invention are provided when the output of the counter 30 is a larger number of bits. In this example, as illustrated in FIG. 7, the two least significant bits of counter 30, on line 34, are used to address the four locations in the register file 10. The register file 10 includes storage for the modified most significant bits of the counter. The most significant bits are the three most significant bits of the counter output 30 transferred on line 32. In this example the valid MSB' bits are two bits indicating which of the MSB' bits may be ignored when determining if a timeout condition occurs. In this example, "01" indicates that the most significant bit of the MSB' bit set may be ignored, i.e., a don't care. A "00" indicates that all bits are to be considered "valid". The timeout line bits designates directly whether timeout lines 0, 1, 2, or 3 (lines 61 through 64 respectively) of FIG. 1 are to be activated when a timeout occurs. The status bit indicates whether the data word is still awaiting a timeout condition. In this example, a status equal to "1" indicates that the status word is still active.

Returning to FIG. 3, the file control logic 11 first initiates operation with step 80 to determine if the status bit of the currently addressed word in the register file 10 is valid. Therefore, the logic determines from the two bits received on line 34 which of the four timeout data words in the register file 10 is being addressed, and within this addressed data word, if the status bit is set. If the status bit is not set, the logic proceeds to step 90 which will be discussed later. However, if the status bit is active, the file control logic 11 outputs the MSB' portion of the timeout data word to the compare circuit 50 on line 16. Proceeding to step 84, the file control logic then outputs the condition code and status information to the timer output logic 60 on line 14. In step 86, the file control logic 11 then outputs the status to the timeout word logic 20 on line 12. Proceeding to step 88, the file control logic 11 determines if a reset status signal has been received. If so, in step 89, the file control logic 11 resets that status bit of the data word stored at the currently addressed location. At the completion of resetting the status or if a status need not be reset, the file control logic 11 proceeds to step 90 to determine if a new timeout data word is available from the timeout word logic 20. If not, the file control logic 11 returns to step 80. If so, the file control logic 11 proceeds to step 92 to load the new timeout word into register file 10 at the currently addressed register file location. Upon completion of the load, the file control logic 11 returns to step 80.

Figure 4:
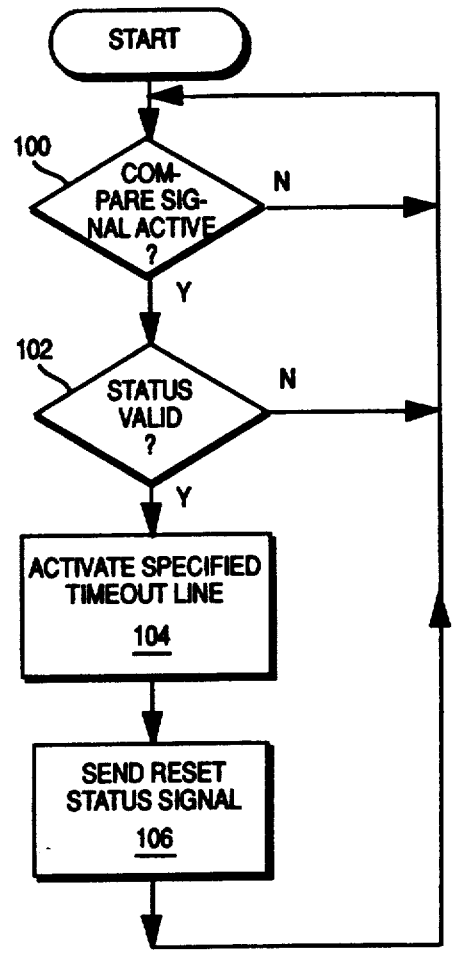
FIG. 4 is a flow chart illustrating the operations of the timer output logic 60.

The timer output logic 60 includes a data flow that illustrated in FIG. 4. In step 100, the timer output logic 60 determines if the compare signal on line 52 has been received. If not, the timer output logic 60 returns to the beginning of the step to await the occurrence of the compare signal. Upon receiving the compare signal, the timer output logic 60 then determines from the register file 10 if the data word being addressed includes a valid status bit. If not, the timer output logic 60 returns to the beginning of step 100. This illustrates what happens when a old timeout data word has been encountered. In step 104, after the valid status bit has been confirmed, the timer output logic 60 activates the specified timeout line, i.e., lines 61 through 64, in accordance with the contents of the addressed timeout data word in the register file 10. Proceeding to step 106, the timer output logic 60 then sends the reset status signal on line 66 (FIG. 1) to the file control logic 11 to reset the status bit of the addressed timeout data word in the register file 10.

An example will now be discussed. For the ease of understanding this is a very simple example. In this example, the two least significant bits are used to address the four word locations in the register file 10 (FIG. 1 and FIG. 7). The most significant bit output of counter 30 are three bits. Therefore the counter 30 provides a total of five bits as an output. The output of the counter 30 is illustrated in FIG. 5 for each of the 32 clock periods. In this example, the timing charts in FIGS. 6a and 6b will be used together with the contents of the register file 10 illustrated in FIG. 7 to discuss the operation of the invention.

Figure 6B:
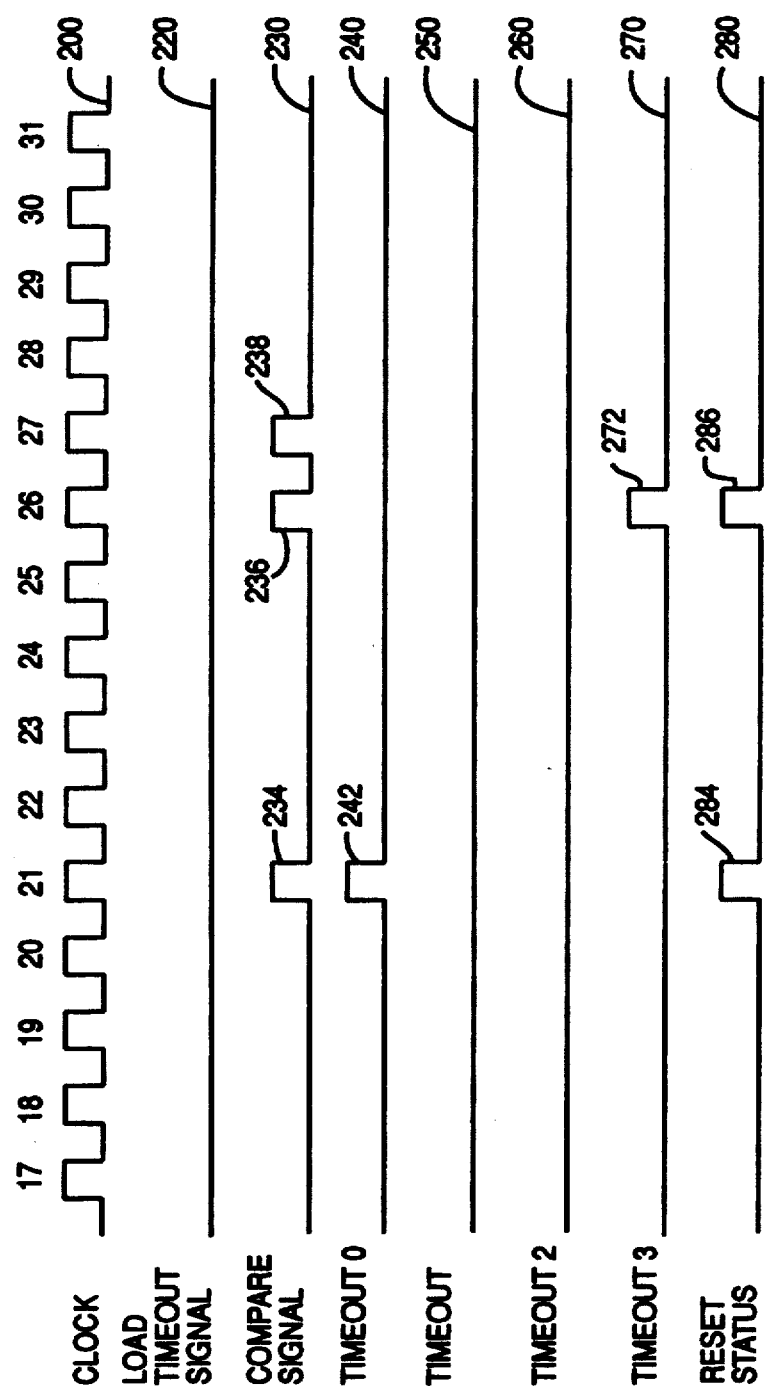

Referring to FIGS. 6a and 6b, it can be seen that FIG. 6a is a timing chart for clock periods 0 through 16 (line 200) and FIGS. 6b is a continuation of this timing chart for clock periods 17 through 31 (line 200). Thus, the clock 40 is constantly providing an output as indicated on line 200 to the counter 30 over line 42. Line 220 represents the load signal on line 22 (FIG. 1) that loads the timeout data to the timeout word logic 20. The compare signal on line 230 represents the output of the compare circuit 50 on line 52 (FIG. 1). Timeout 0, Timeout 1, Timeout 2 and Timeout 3 on lines 240, 250, 260 and 270 represent the timeout line outputs of the timer output logic 60 on lines 61 through 64 respectively (FIG. 1). The reset status line 280 represents the signal provided by the timer output logic 60 on line 66 (FIG. 1).

In this example, at clock period 0, at time 222 (line 220) a load signal is received on line 22 by the timeout word logic 20. At that point the timeout word logic 20 then receives data on the timeout data line 24. In this example this information indicates that the time period to be measured is 8 clock cycles (the valid MSB' indicates that the middle bit is a "don't care"). The timeout word logic 20 receiving the most significant bit output on line 32 from counter 30 resets the most significant bit (bit 3) such that the modified most significant bit (MSB') is equal "100". Also, the timeout data received specifies that all bits but the middle bit are valid, i.e., the valid MSB' bits are "01". The timeout line to be activated upon a timeout condition is 1. The timeout line designation is used to signify which timeout condition is generating the timeout signal. The status is then set equal to 1. This data word consisting of the "MSB'" "valid MSB'" bits, timeout line bits, and status bit is then loaded into the register file at the location that is being currently addressed by the two least significant bits output from counter 30 on line 34. In this example these least significant bits are "00". Therefore, as illustrated in FIG. 7, the data word is stored in address 00. The next event, at clock period 4, is a reception of a new load signal on line 22 by the timeout word logic 20. New timeout data is then provided on line 24 to timeout word logic 20. However, as seen from FIG. 5, the least significant bits being output from counter 30 are 00. The data word stored in register file 10 at address 00 has a valid address bit. Therefore the timeout word logic 20 waits until the next address from the counter 30. At that time, the timeout word logic 20 determines that the next address word location "01" is available. The timeout word logic 20 then loads the word illustrated in FIG. 7 in location 01.

Referring to FIG. 6a again, at the 8th clock cycle, the timeout data word being accessed by the register file is 00. This being provided to the compare logic 50. At this time the most significant bit output on line 32 is also provided to the compare logic 50. Since 8 clock periods have passed, a timeout event should occur. This will occur since the MSB' is now equal to the MSB output of counter 30. Therefore the compare circuit 50 will provide an output on line 52 to the timer output logic 60. Also the data for this timeout data word is provided to timer output logic 60 to indicate that Timeout line 1 is to be output. This occurs as indicated at period 252 on line 250. The timer output logic 60 also provides a reset status signal 282 on line 280 over line 66 to the file control logic 11 to reset the status bit of the data word at address 00.

At time period 10, a load signal is received (time 226 on line 220) by the timeout word logic 20. The least significant bit output of counter 30 on line 34 is providing the address "10". Therefore the timeout data on line 24 received by the timeout word logic 20 is provided to the register file 10 as illustrated in FIG. 7 at the address 10.

Continuing to FIG. 6b, at time period 21, the second data word stored in the register file (address 01) is being provided to the compare circuit 50 and the timer output logic 60. At this time, the modified MSB' portion is equal to the MSB output of the counter 30 thus providing a compare signal on line 52 as illustrated as signal 234 on line 230. This is provided to the timer output logic 60 and together with the other information from the register file 10, the timer output logic 60 activates the Timeout 0 line 61 as indicated by pulse 242 on line 240 in FIG. 6b. Also, a reset signal 284 is provided on line 66 to the register file 10.

At clock period 26, the LSB address is equal to 10 and the timeout data word at this address in the register file 10 is provided to the compare circuit 50 and the timer output logic 60 resulting in the generation of the compare signal pulse 236 on line 230 and the pulse 272 on the Timeout 3 line 64 as illustrated. Again a reset status pulse 286 is provided on line 66 to the register file 10.

Lastly, in clock period 27, the addressed register file timeout data word is provided to the compare circuit 50 and the timer output logic 60. This results in a compare pulse on line 52 (signal 238 on line 230 of FIG. 6b) being provided to the timer output logic 60. However, as illustrated in FIG. 7, this status indicates an invalid data word. Therefore there are no timeout signals produced.

In the preferred embodiment the counter is a modulo counter meaning that the counter cycles back to zero after producing a word of all ones. It should be apparent to those skilled in the art that by resetting the appropriate MSB' bits as illustrated in the example, the recycling of the counter will not affect the performance of the timer.

Figure 8:
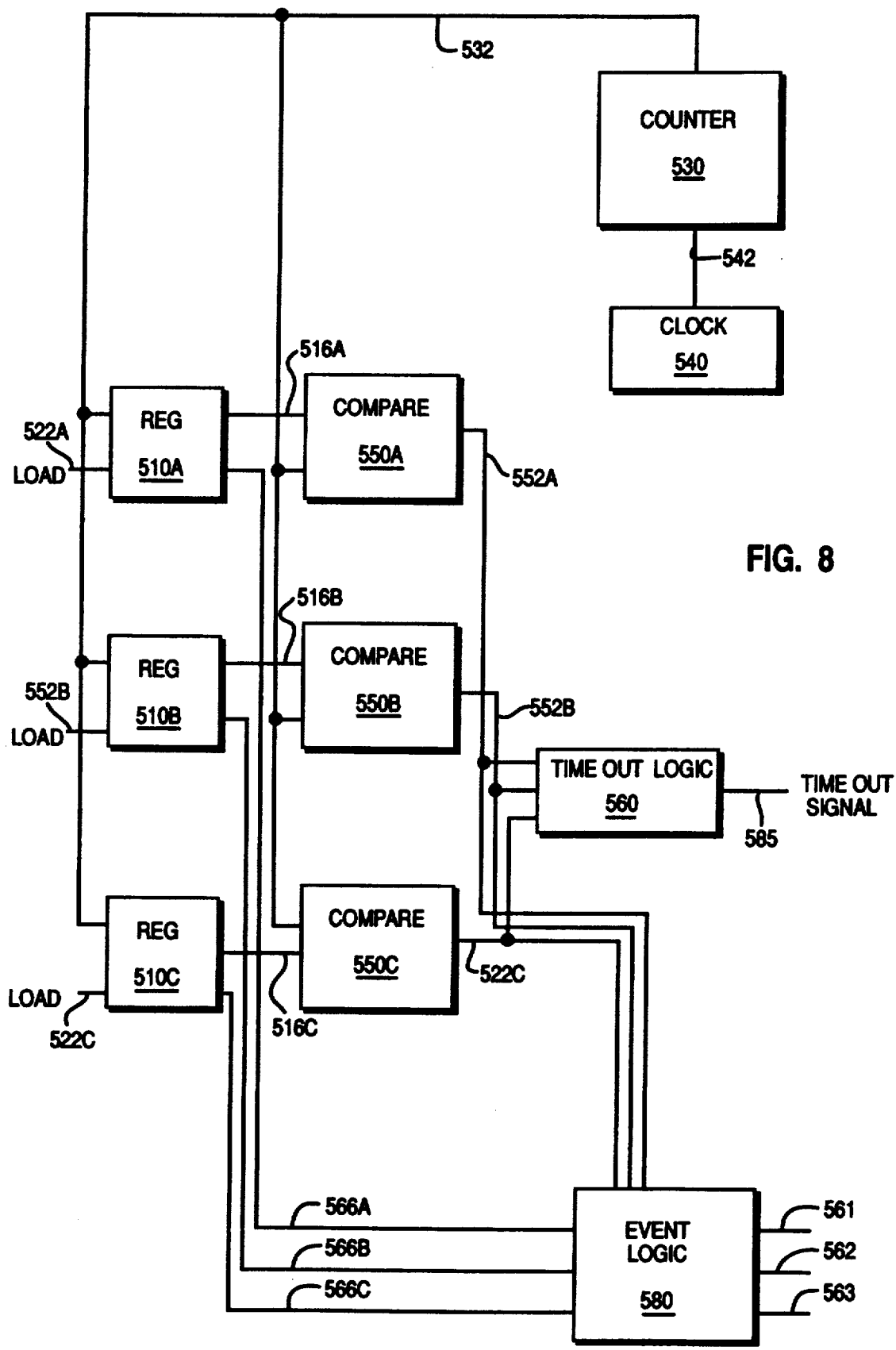
FIG. 8 is a block diagram of an alternative embodiment of a multiple event timer circuit.

FIG. 8 is a second preferred embodiment of the present invention. FIG. 8 consists of a counter 530 connected by a line 542 to a clock 540. The output of the counter on line 532 is provided to registers 510A 510B and 510C together with comparator circuits 550A, 550B and 550C. Registers 510A, 510B and 510C also include individual load lines 522A, 522B and 522C respectively. The comparators 550A, 550B and 550C receive inputs from registers 510A, 510B and 510C over lines 516A, 516B and 516C. Also, the comparators 550A, 550B and 550C are provided with the counter output over line 532. The comparators provide outputs to the timeout logic 560 via lines 552A, 552B and 552C. Lines 552A, 552B and 552C are also provided to event logic 580. Event logic 580 also receives lines 566A, 566B and 566C from registers 510A, 510B and 510C respectively. The event logic provides three outputs on lines 561, 562 and 563. This is used together with the output on line 585 from the timeout logic 560 to determine that (1) a timeout condition has occurred, and (2) which specific event caused the timeout.

In operation, the circuitry in FIG. 8 is similar to the circuitry explained previously in FIG. 1. The clock 540 provides the clocking signal over line 542 to the counter 530. However, the counter 530 provides a single output on line 532 to both the registers 510A, 510B and 510C and to the comparators 550A, 550B and 550C. The load signals on lines 522A, 522B and 522C provide an indication to the registers 510A, 510B and 510C respectively to load the current output of the counter 530. In this second preferred embodiment, the signals on lines 522A, 522B and 522C can specify specific timeout events, i.e., provide a signature for the event being timed. This event signature is provided over lines 566A, 566B and 566C to the event logic 580. At each clock cycle, the output of the counter 530 is provided to the comparators 550A, 550B and 550C where each comparator compares this output with the register output of its respective registers 510A, 510B and 510C. Upon occurrence of a timeout condition, the comparators 550A, 550B and 550C provide outputs to the timeout logic 560 which provides a signal on line 585. At the same time, the comparator that is providing the output to the timeout logic 560 also provides an output to the event logic 580 either over lines 552A, 552B or 552C. This comparator signal is then used to read the data on lines 566A, 566B or 566C for the register that has been timed out to provide the event signature signal on line 561, 562 or 563. The obvious advantage of the second embodiment over the first embodiment is that in the second embodiment, each count of the counter 530 can be used to timeout any of the timing events in the registers. The load signal on lines 522A, 522B and 522C in loading the output of the counter 530 over line 532 will specify the bits being set in the respective registers 510A, 510B and 510C and thus specify the timeout period in a manner previously explained.

Although this invention has been described with reference to the specific embodiment, this description is not meant to be construed in a limiting sense. Various modifications of the disclosed embodiment, as well as other embodiments of the invention will become apparent to those persons skilled in the art upon reference to the description of this invention. It is, therefore, contemplated that the appended claims will cover any such modifications or embodiments that fall within the true scope of this invention.

We claim:

1. A timer comprising:
   counter means for repetitively providing a current output each having an iteratively increasing sequence of bits relative to a preceding output;
   timeout data means for forming a timeout data word from a specified time period and a first counter means output;
   register means for storing said timeout data word at an address formed from said first counter means output; and
   comparison means for comparing each counter means output with a timeout data word at an address formed from said each counter means output and providing a timeout signal when equal.

2. A timer according to claim 1 wherein said first counter means output is the counter means output at the time the specified time period is received by said timeout data means.

3. A timer according to claim 2 wherein said specified time period includes information specifying which bits of the first counter means output are to be altered to specify said time period.

4. A timer according to claim 3 wherein said information also includes a specific one of a plurality of timeout signals to be provided by said comparison means.

5. A timer according to claim 4 wherein said information includes specified bits of the timeout data word to be ignored when said comparison means compares each counter means output with the timeout data word.

6. A timer according to claim 5 wherein said address is formed from a least significant plurality of bits of said counter output.

7. A timer according to claim 6 wherein said timeout data word is formed from a most significant plurality of bits of said counter output.

8. A timer according to claim 7 wherein said register means stores a status bit for each timeout data word indicating whether a timeout has occurred for that timeout data word.

9. A timer comprising:
   counter means for repetitively providing a current output each having an iteratively increasing sequence of bits relative to a preceding output;
   timeout data means for receiving information defining a timeout time and for providing a timeout data word formed from said information and a first portion of a first one of said counter means outputs;
   register means for receiving and storing said timeout data word from said timeout data means at an address specified by a second portion of said first one of said counter means outputs; and
   comparison means for comparing a first portion of each current counter means output with a first portion of said stored timeout data word in said register means stored at an address specified by a second portion of said current counter means output and providing a timeout signal when said timeout data word portion is equal to said current counter means first portion.

10. A timer according to claim 9 wherein said first counter means output is the counter means output at a time a specified time period is received by said timeout data means.

11. A timer according to claim 10 wherein said information specifies which bits of the first portion of the first counter means output are to be altered to specify said time period.

12. A timer according to claim 11 wherein said information also includes a specific one of a plurality of timeout signals to be provided by said comparison means.

13. A timer according to claim 12 wherein said information includes specified bits of the timeout data word to be ignored when said comparison means compares the first portion of each current counter means output with the timeout data word.

14. A timer according to claim 13 wherein said second portion is a least significant plurality of bits of said counter output.

15. A timer according to claim 14 wherein said first portion is a most significant plurality of bits of said counter output.

16. A timer according to claim 15 wherein said register means stores a status bit for each timeout data word indicating whether a timeout has occurred for that timeout data word.

17. A timer according to claim 15 wherein said comparison means includes means, for resetting the status bit in said register means indicating that the timeout has occurred for that timeout data word when the timeout signal for that timeout data word has been provided.

18. A timer according to claim 17 wherein said register means includes means for storing a plurality of timeout data words each stored at a unique address.

19. A timer according to claim 18 wherein said timeout data means includes means for determining if a previously stored timeout data word, stored at an address of the second portion of the current counter means output, is still awaiting a timeout to occur, and, if not, storing a currently formed timeout data word at the address.

20. A timer according to claim 19 wherein said timeout data means includes means for waiting for a next address from a second portion of a next counter means output to store a currently formed timeout data word when the previously stored timeout data word stored at the address of the second portion of the current counter means output is awaiting for a timeout to occur.

21. A timer comprising:
counter means for repetitively providing a current output, each having an iteratively increasing sequence of bits relative to a preceding output;
a plurality of load signal means each for providing a load signal specifying a current output from the counter means and including means for specifying a timeout period;
a plurality of register means each connected to an individual and unique one of said load signal means and for forming a timeout data word from said current counter means output and said specified time period from its connected load signal means and each including means for storing its respective timeout data word; and
comparison means for comparing each successive counter means output with the timeout data word in each of said register means and providing a timeout signal when any one timeout data word is equal to the compared counter means output.

22. A timer circuit according to claim 21 wherein at least one load signal means includes means for designating a specific timed event, said register means connected to said at least one load signal means includes means for storing data designating a specified time event and the comparison means includes means for providing a signal designating that a timed event has occurred when the timeout data word for the register means connected to said at least one load signal means is equal to the compared counter means output.

* * * * *